United States Patent [19]

Ide et al.

[11] Patent Number: 4,629,646
[45] Date of Patent: Dec. 16, 1986

[54] MAGNETIC RECORDING MEDIUM

[75] Inventors: Toshiaki Ide; Tohru Shimozawa, both of Saku; Masaharu Nishimatsu, Komoro, all of Japan

[73] Assignee: TDK Corporation, Tokyo, Japan

[21] Appl. No.: 753,779

[22] Filed: Jul. 11, 1985

[30] Foreign Application Priority Data

Jul. 31, 1984 [JP] Japan .................................. 59-158867

[51] Int. Cl.[4] .............................................. G11B 5/70
[52] U.S. Cl. .................................... 428/143; 360/134; 360/135; 360/136; 427/44; 427/128; 427/131; 428/148; 428/323; 428/328; 428/329; 428/408; 428/694; 428/900
[58] Field of Search ............... 428/694, 695, 408, 336, 428/323, 328, 329, 143, 148; 427/44, 130, 131, 128; 360/134–136; 252/62.54

[56] References Cited

U.S. PATENT DOCUMENTS

| 4,091,924 | 5/1978 | Newton | 428/900 |
| 4,135,031 | 1/1979 | Akashi | 428/323 |
| 4,275,113 | 6/1981 | Saito | 428/323 |
| 4,310,599 | 1/1982 | Akashi | 428/323 |
| 4,337,288 | 6/1982 | Takenaka | 428/172 |
| 4,367,261 | 1/1983 | Miyoshi | 428/900 |
| 4,414,270 | 11/1983 | Miyoshi | 428/900 |
| 4,415,630 | 11/1983 | Kubota | 428/500 |
| 4,419,406 | 12/1983 | Isobe | 428/694 |
| 4,439,486 | 3/1984 | Yamada | 428/694 |
| 4,443,514 | 4/1984 | Yamamoto | 428/694 |
| 4,448,842 | 5/1984 | Yamaguchi | 427/128 |
| 4,455,345 | 6/1984 | Miyatuka | 428/694 |

Primary Examiner—Ellis P. Robinson
Attorney, Agent, or Firm—Oblon, Fisher, Spivak, McClelland, & Maier

[57] ABSTRACT

A magnetic recording medium comprising a non-magnetic substrate, a magnetic recording layer formed on one side of the substrate and a back coating layer formed on the other side of the substrate, characterized in that the back coating layer contains carbon black having an ash content of at most 0.05%, a specific surface area of from 20 to 350 m$^2$/g, an oil absorption of at most 200 ml/100 g and an average particle size of from 13 to 60 m$\mu$m.

6 Claims, 4 Drawing Figures

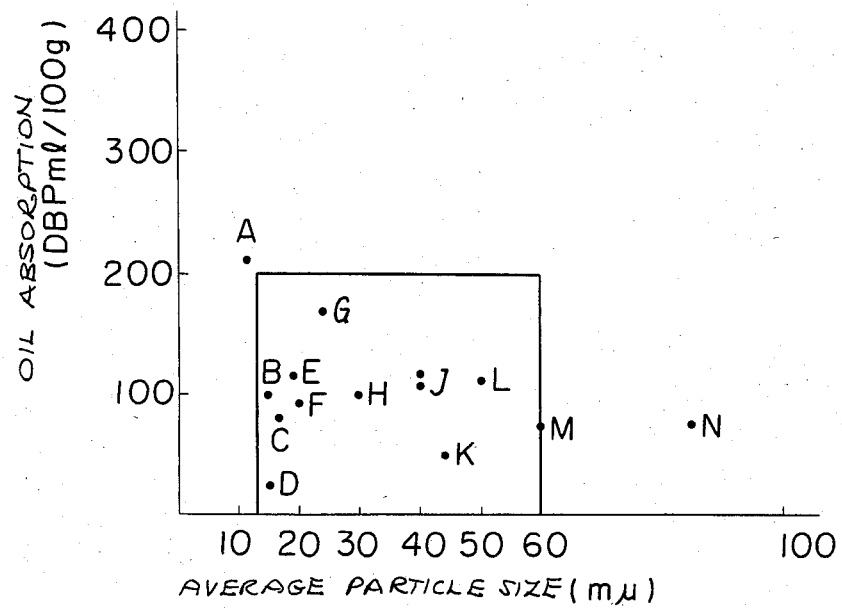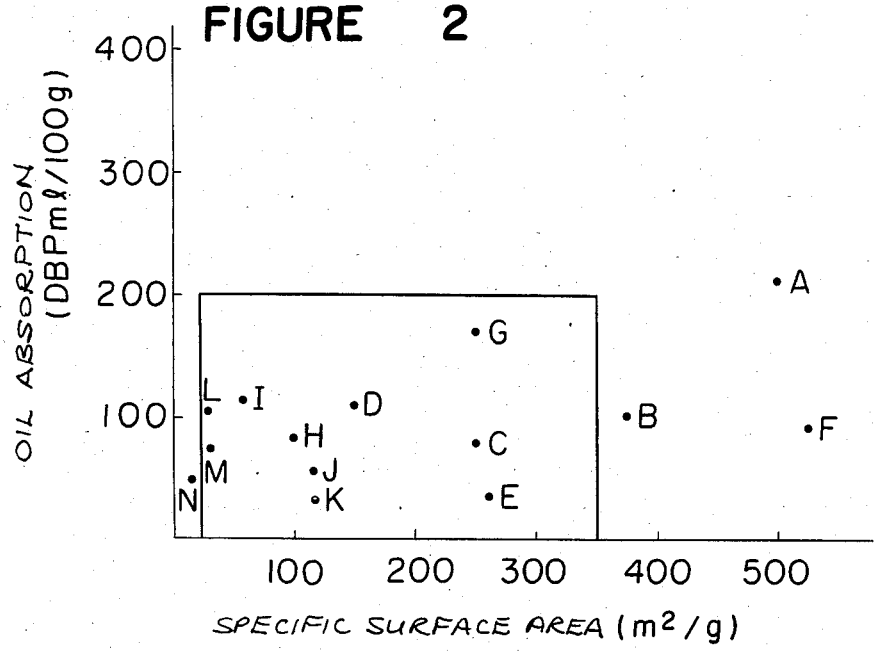

MAGNETIC RECORDING MEDIUM

BACKGROUND OF THE INVENTION

1. FIELD OF THE INVENTION

The present invention relates to a magnetic recording medium having excellent electromagnetic conversion characteristics, running durability and a good winding appearance with minimum abrasion of the back coating layer. More particularly, the present invention relates to a magnetic recording medium having a feature in the composition of the coating layer (i.e. the back coating layer) formed on the resin side of the substrate opposite to the side on which a magnetic recording layer is provided.

2. DESCRIPTION OF THE PRIOR ART

Recently, magnetic recording media have been widely used in the fields of audio and video recording, computers, magnetic discs, etc. Accordingly, the amount of information to be recorded on magnetic recording media increases year after year, and there is an increasing demand for the improvement of the recording density of magnetic recording media.

As one of the conditions required for a magnetic recording medium for high density recording, it has been suggested to improve the coercive force and to make the medium thinner both from the theoretical and experimental points of view. There have been various proposals with respect to the compositions of the binder (binding agent), inorganic filler or lubricant for the back coating layer (e.g. Japanese Examined Patent Publication No. 29769/1982). However, there have been various problems with respect to the running durability (the winding appearance, the abrasion of the back coating layer, or the susceptibility of the back coating layer to scars due to abrupt stopping of the running tape), the adhesion of the back coating layer or calender stains during the process for the preparation (dropouts caused by the abrasion of the back coating layer or the calender stains). Further, none of them is fully satisfactory with respect to the electromagnetic conversion characteristics.

In a recording system presently available in which a magnetic head is employed, a spacing loss between the tape and the head is represented by $54.6\, d/\lambda [dB]$ where d is a distance between the tape and the head, and $\lambda$ is a recording wavelength. As is evident from this formula, in a short wave recording system having a high recording density which has been highly in demand recent years for the reason of e.g. abundant information to be recorded, the rate of the decrease in the output attributable to the spacing is extremely great as compared with the long wave recording system. Accordingly, even a fine foreign matter deposited on the tape surface is likely to lead to a failure to detect a pulse which should be detected at the time of reading out the information written in the magnetic recording medium and thus is likely to be detected as a dropout. As the causes for the foreign matters attributable to the dropouts, there may be mentioned magnetic powder fallen off from the magnetic layer of the magnetic recording tape as a result of a deterioration of the magnetic layer due to the repeated exertion of stress, or particles abraded off from the substrate during the tape running or dusts which are electrostatically deposited on the substrate surface and then transferred to the magnetic layer surface. In order to prevent the deposition of foreign matters, there have been proposed a method wherein a coating composition prepared by kneading an inorganic filler such as carbon black or graphite with an organic binder, is coated on the rear side of the substrate opposite to the magnetic layer side of the magnetic recording tape, to provide an antistatic property, or a method wherein the abrasion of the substrate is minimized by making the substrate tough. Further, in the case where the magnetic layer is of a thin metal film-type, the magnetic layer is so thin that the magnetic recording medium is susceptible to curling. The back coating layer plays an important role also in this sense, i.e. for the prevention of such curling. By these treatments, the tendency for the increase of dropouts during the repeated running, can be suppressed to some extent. However, such a level is not still adequate, and it is required to further reduce such a tendency

SUMMARY OF THE INVENTION

The present inventors have conducted further researches to overcome the above difficulties, and as a result, have found that the above difficulties can be solved by using carbon black having certain specific properties. The present invention has been accomplished on the basis of this discovery.

Namely, the present invention provides a magnetic recording medium comprising a non-magnetic substrate, a magnetic recording layer formed on one side of the substrate and a back coating layer formed on the other side of the substrate, characterized in that the back coating layer contains carbon black having an ash content of at most 0.05%, a specific surface area of from 20 to 350 $m^2/g$, an oil absorption of at most 200 ml/100 g and an average particle size of from 13 to 60 m$\mu$m.

BRIEF DESCRIPTION OF THE DRAWINGS

In the accompanying drawings,

FIG. 1 shows the relation between the average particle size and the oil absorption of each carbon black used in Example 1.

FIG. 2 shows the relation between the specific surface area and the oil absorption of each carbon black used in Example 1.

DETAILED DESCRIPTION OF THE INVENTION

Figure 3:
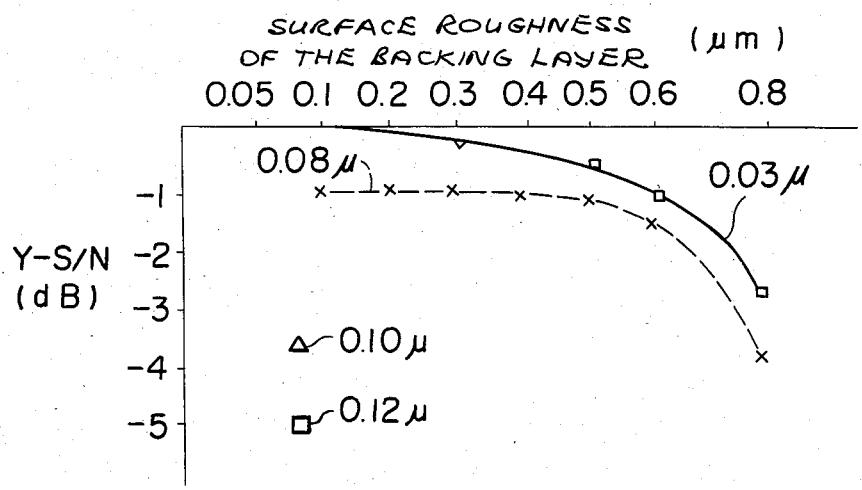
FIG. 3 is a graph illustrating the relation between the surface roughness of the magnetic layer and the back coating layer of a magnetic recording medium and the S/N ratio.

The ash content in ordinary carbon black is at least 0.1% and at most about 1%, and usually from 0.3 to 0.4%. The impurities constituting the ash content are $Fe_2O_3$, $Fe_2(SO_4)_3$, $TiO_2$, MnO, $CaSO_4$, $MgSO_4$, $Al_2O_3$, $SiO_2$, $K_2SO_4$, etc. These impurities are included during the production of the carbon black.

It has been found that if these impurities are reduced, the dispersibility of the carbon black improves. If the content of these impurities is 0.05% or less, the dispersibility remarkably improves, and the gloss of the back coating surface improves. Thus, it has been found that carbon black can be used in the wider ranges of the specific surface area, the oil absorption and the average particle size.

Normally, it is necessary to use the carbon black having relatively limited specific surface area, oil absorption and average particle size in order to obtain suitable properties. Whereas, according to the present invention, carbon black with the above-mentioned wide ranges can be used by reducing the ash content as mentioned above.

As the carbon black to be used for the back coating layer in the present invention, there may be employed any carbon black produced by any one of conventional methods, such as furnace, channel, acetylene, thermal or lamp. However, acetylene black, furnace black, channel black, roller and disc black and German naphthalene black are preferred. The carbon black used in the present invention has an ash content of at most 0.05%, a specific surface area of from 20 to 350 m$^2$/g, an oil absorption of at most 200 ml/100 g and an average particle size of from 13 to 60 m$\mu$m. Such a carbon black can be produced, for instance, by reducing the impurities in the starting material system, by using a special apparatus so that no impurities will be included during the process for the preparation, or by improving the cleaning operation or by providing a subsequent water-washing operation.

The above-mentioned ranges of the specific surface area and the oil absorption are preferred in view of the dispersibility.

Further, if the particle size exceeds 60 m$\mu$m, the dispersibility tends to decrease, and the electromagnetic conversion characteristics will be impaired. On the other hand, if the particle size is less than 13 m$\mu$m, the dispersion of the particles in the coating material for the back coating layer tends to be non-uniform, whereby a uniform dispersion is not obtainable, thus leading to a decrease of the Young's modulus of elasticity. Further, because of the non-uniformity, it is impossible to adequately reduce the electrostatic property of the back coating layer. Other additives which are commonly used for the back coating layers of this type, such as inorganic pigments, lubricants, organic binders, dispersing agents or antistatic agents, may be incorporated in the back coating layer of the present invention in a usual manner.

As the inorganic pigment, there may be mentioned, (1) ZrO$_2$, graphite, or (2) an inorganic filler such as SiO$_2$, TiO$_2$, Al$_2$O$_3$, Cr$_2$O$_3$, Y$_2$O$_3$, CeO$_2$, Fe$_3$O$_4$, ZrSiO$_4$, Sb$_2$O$_5$, SnO$_2$, SiC, CaO, CaCO$_3$, zinc oxide, geothite, $\alpha$Fe$_2$O$_3$, talc, kaolin, CaSO$_4$, boron nitride, fluorinated graphite, molybdenum disulfide or ZnS. Further, the following fine particulate pigments (aerosil type or colloidal type) may also be employed: SiO$_2$, Al$_2$O$_3$, TiO$_2$, ZrO$_2$, Cr$_2$O$_3$, Y$_2$O$_3$, CeO$_2$, Fe$_3$O$_4$, Fe$_2$O$_3$, ZrSiO$_4$, Sb$_2$O$_5$ and SnO$_2$. These fine particulate pigments have a particle size of less than 200 Å, preferably at most 150 Å. In the case of SiO$_2$, the fine particulate pigment is available in the form of (1) a colloidal solution of super-fine particles of silicic anhydride (Snowtex (trademark), an aqueous system, a methanol silica sol, etc., manufactured by Nissan Chemical Industries, Ltd.) or (2) super-fine particulate anhydrous silica (Standard product: 100 Å) produced by burning purified silicon tetrachloride (Aerosil (trademark), manufactured by Nippon Aerosil Co., Ltd.). Further, it is possible to use super-fine particulate aluminum oxide and titanium oxide which can be produced by a vapour phase method in the same manner as for the above-mentioned colloidal solution of super-fine particles (1) and the super-fine particulate anhydrous silica (2), as well as the above-mentioned fine particulate pigments. The amount of such an inorganic pigment to be incorporated should preferably be from 20 to 200 parts by weight relative to 100 parts by weight of the binder in the case of (1) and from 10 to 300 parts by weight in the case of (2). When the amount of the inorganic pigment is too large, there will be disadvantages such that the coating film becomes brittle and the number of dropouts increases.

The particle size of these inorganic pigments is preferably from 10 to 100 m$\mu$m. When the particle size is small, the inorganic pigment may have high hardness, and yet no abrasion of tape guides is likely to take place.

As the lubricant, there may be mentioned e.g. silicone oil, fluorine oil, a fatty acid, a fatty acid ester, a paraffin, a liquid paraffin or a surfactant which has been commonly used as a lubricant for the back coating layer of this type. However, it is particularly preferred to use a fatty acid and/or a fatty acid ester.

As the fatty acid, there may be mentioned a fatty acid having at least 12 carbon atoms (RCOOH where R is an alkyl group having at least 11 carbon atoms) such as caprylic acid, capric acid, lauric acid, myristic acid, palmitic acid, stearic acid, behenic acid, oleic acid, elaidic acid, linolic acid, linolenic acid or stearolic acid. As the fatty acid ester, there may be employed a fatty acid ester of a monobasic fatty acid having from 12 to 16 carbon atoms with a monohydric alcohol having from 3 to 12 carbon atoms or a fatty acid ester of a monobasic fatty acid having at least 17 carbon atoms with a monohydric alcohol having carbon atoms in a total of from 21 to 23 as added with the number of carbon atoms of the fatty acid. Further, metallic soaps of the above-mentioned aliphatic acids with alkali or alkaline earth metals and lecithin may also be used.

As the silicone, there may be employed a fatty acid-modified silicone or a partially fluorinated silicone. As the alcohol, there may be employed a higher alcohol. As the fluorine oil, there may be employed those produced by electrolytic substitution, telomerization or oligomerization.

Among the lubricants, radiation curable type lubricants may be advantageously employed to prevent the transfer of the roughness of the rear side to the ferromagnetic thin layer or to reduce dropouts or the difference in the output as between the outside and the inside of the roll of a rolled tape, and to make the production on-line possible. Such radiation curable lubricants include compounds containing in their molecules molecular chains exhibiting lubricating properties and acrylic double bonds, such as acrylates, methacrylates, vinyl acetates, acrylic acid amide compounds, vinyl alcohol esters, methyl vinyl alcohol esters, allyl alcohol esters and glycerides. These lubricants may be represented by the following structural formulas:

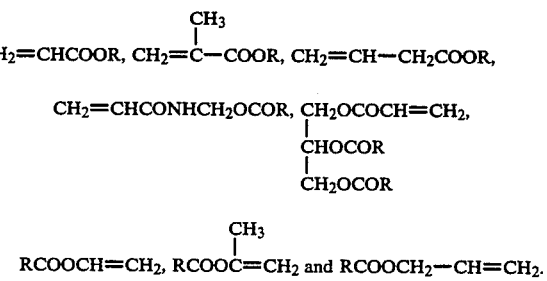

In the above formulas, R is a straight chain or branched, saturated or unsaturated hydrocarbon group having at least 7 carbon atoms, preferably from 12 to 23 carbon atoms, which may be substituted by fluorine. As the fluorinated substituents, there may be mentioned $C_nF_{2n+1}-$, $C_nF_{2n+1}(CH_2)_m-$ (where m=1-5), $$C_nF_{2n+1}SO_2\overset{R}{N}CH_2CH_2-,\ C_nF_{2n+1}CH_2CH_2NHCH_2CH_2-,$$

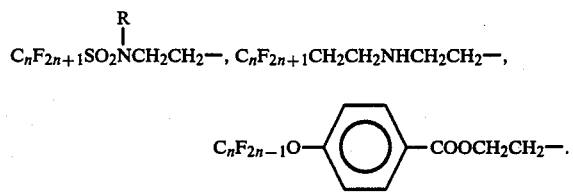

$$C_nF_{2n-1}O-\!\!\left\langle\!\!\bigcirc\!\!\right\rangle\!\!-COOCH_2CH_2-.$$

Preferred specific examples of such radiation curable lubricants include stearic acid methacrylate or acrylate, methacrylate or acrylate of stearyl alcohol, methacrylate or acrylate of glycerin, methacrylate or acrylate of glycol, and methacrylate or acrylate of silicone.

If no lubricant is incorporated, the back coating layer will have a high frictional coefficient, whereby flickering of the image or jitters are likely to be brought about. Further, since the frictional coefficient is especially high under a high temperature running condition, abrasion of the back coating layer is likely to be led, and the tape winding tends to be irregular.

As the organic binder to be used for the back coating layer of the present invention, there may be employed thermoplastic resins, thermosetting resins or reactive resins, or mixtures thereof, which are commonly used for the magnetic recording media. However, from the viewpoint of the strength of the formed coating layer, a thermosetting type resin, particularly a radiation curable type resin, is preferred.

As the thermoplastic resins, there may be employed those having a softening point of at most 150° C., an average molecular weight of from 10,000 to 200,000 and a degree of polymerization of from about 200 to 2,000. For instance, there may be mentioned a vinyl chloride-vinyl acetate copolymer (including the one containing a carboxylic acid), a vinyl chloride-vinyl acetate-vinyl alcohol copolymer (including the one containing a carboxylic acid), a vinyl chloride-vinylidene chloride copolymer, a vinyl chloride-acrylonitrile copolymer, an acrylate-acrylonitrile copolymer, an acrylate-vinylidene chloride copolymer, an acrylate-styrene copolymer, a methacrylate-acrylonitrile copolymer, a methacrylate-vinylidene chloride copolymer, a methacrylate-styrene copolymer, a urethane elastomer, a nylon-silicone resin, a nitrocellulose-polyamide resin, a polyvinyl fluoride, a vinylidene chloride-acrylonitrile copolymer, a butadiene-acrylonitrile copolymer, a polyamide resin, a polyvinylbutyral, a cellulose derivative (such as cellulose acetate, cellulose diaceate, cellulose triacetate, cellulose propionate or nitrocellulose), a styrene-butadiene copolymer, a polyester resin, a chlorovinyl ether-acrylate copolymer, an amino resin, a synthetic rubber-type thermoplastic resin, or a mixture thereof.

As the thermosetting resins or reactive resins, there may be employed those which have a molecular weight of at most 200,000 in the state of the coating solutions and which undergo, when heated after being applied and dried, a condensation or addition reaction to have an unlimited molecular weight. Among these resins, those which do not soften or melt until the thermal decomposition, are preferred. Specifically, there may be mentioned, for instance, a phenol resin, an epoxy resin, a polyurethane thermosetting resin, a urea resin, a melamine resin, an alkyd resin, a silicone resin, an acrylic reactive resin, an epoxy-polyamide resin, a nitrocellulose melamine resin, a mixture of a high molecular weight polyester resin with an isocyanate prepolymer, a mixture of methacrylate copolymer with a diisocyanate prepolymer, a mixture of a polyester polyol with a polyisocyanate, a urea formaldehyde resin, a mixture of a low molecular weight glycol/a high molecular weight diol/triphenylmethane triisocyanate, a polyamine resin or a mixture thereof.

Particularly preferred is a thermosetting resin which is a combination of a cellulose resin (e.g. nitrocellulose), a vinyl chloride-vinyl acetate-vinyl alcohol copolymer and urethane (wherein a curing agent is used), or a radiation curable resin which is composed of a vinyl chloride-vinyl acetate-vinyl alcohol coplymer (including the one containing a carboxylic acid) or an acryl-modified vinyl chloride-vinyl acetate-vinyl alcohol copolymer (including the one containing a carboxylic acid) and a urethane acrylate. As the radiation curable resin, there may be employed, in addition to the above-mentioned preferred combination, a thermoplastic resin which contains in its molecule or is incorporated with radiation curable or polymerizable groups such as acrylic double bonds of acrylic acid, methacrylic acid or their ester compounds containing unsaturated double bonds having radical polymerizability, allyl-type double bonds of e.g. diallyl phthalate, or unsaturated bonds of e.g. maleic acid or a maleic acid derivative. As other useful binder components, there may be mentioned acrylic acid, methacrylic acid and acrylamide as monomers. A binder containing double bonds may also be obtained by modifying various polyesters, polyols, polyurethanes or the like with a compound having an acrylic double bond. Further, it is also possible to obtain resins having various molecular weights by incorporating a polyhydric alcohol and a polybasic carboxylic acid, as the case requires. The above-mentioned specific examples are only a part of useful radiation sensitive resins, and they may be used in combination as a mixture. Particularly preferred is a combination comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond, in the proportions of from 20 to 70% by weight of the compound (A), from 20 to 80% by weight of the compound (B) and from 10 to 40% by weight of the compound (C).

The molecular weights of the polymers and oligomers of the Compounds (A), (B) and (C), are number average molecular weights obtained by the following measuring method.

Measurement of an average molecular weight of a binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{\Sigma Ni}$$

where Mn is a number average molecular weight, and Ni is a number of molecules having a molecular weight of Mi in a given polymer substance.

It is advantageous to use a radiation curable resin, since the curing time is short and there will be no transfer of e.g. fillers from the back coating surface to the magnetic layer after the winding up operation. Whereas, in the case of thermosetting resin, there will be a problem that the electromagnetic conversion characteristics differ as between the inner side and the outer side of the jumbo roll during the course of the thermosetting due to the transfer of the rear side pattern of the back coating surface caused by the tightening of the winding of the jumbo roll at the time of the thermosetting.

The curing agent to be used for the thermosetting resin in the present invention may be any curing agent which is commonly used for thermosetting resins of this type. Particularly preferred is an isocyanate-type curing agent. For instance, there may be mentioned Kryspon 4565 and 4560 manufactured by Dai-Nippon Ink & Chemicals Co., Colonate L manufactured by Nippon Polyurethane Industry Co. and Takenate XL-1007 manufactured by Takeda Chemical Industries, Ltd.

As the dispersing agent, there may be employed an organic titanium coupling agent, a silane coupling agent or a surfactant. As the antistatic agent, there may be employed a natural surfactant such as saponin; a nonionic surfactant such as an alkylene oxide-type, a glycerin-type or a glycidol-type; a cationic surfactant such as a higher alkyl amine, a quaternary ammonium, pyridine or other heterocyclic compounds, phosphonium or a sulfonium; an anionic surfactant containing acid groups such as carboxylic acid groups, sulfonic acid groups, phosphoric acid groups, sulfate groups or phosphate groups; or an amphoteric surfactant such as an amino acid, an amino sulfonic acid or a sulfuric acid or phosphoric acid ester of an amino alcohol.

In the present invention, carbon black, the inorganic oxide pigment, the organic binder, the lubricant and other additives are usually used in the following proportions for the back coating layer. With respect to the inorganic pigment incorporated in the organic binder and the lubricant in the back coating layer, the weight ratio of the inorganic pigment to the organic binder is preferably from 4/1 to ¼. If the amount is excessive, the pigment tends to be hardly dispersed. On the other hand, if the amount is too small, the back coating layer tends to be brittle. The ratio is more preferably from 3/1 to ⅓.

The weight ratio of the organic binder to the lubricant is preferably 100:20.

With respect to the carbon black, the weight ratio of the carbon black to the inorganic pigment is preferably from 1/9 to 8/2, more preferably from 1/9 to 5/5.

If the amount of the binder is excessive, blocking tends to occur. On the other hand, if the binder is insufficient, adhesion is likely to occur during the calender treatment, such being undesirable.

The thickness of the back coating layer of the present invention is usually within a range of from 0.3 to 10 $\mu$m after being coated and dried.

In the case where the lubricant or the organic binder of the back coating layer or of the magnetic layer is of a radiation curable type, as the active energy rays to be used for cross-linking, there may be employed electron beams generated from a radiation accelerator as the source of radiation, $\gamma$-rays generated from $Co^{60}$ as the source of radiation, $\beta$-rays generated from $Sr^{90}$ as the source of radiation, or X-rays or ultraviolet rays generated from an X-ray generator as the source of radiation.

From the viewpoints of the easy control of the absorption dose, the introduction to the production line, or the shielding of ionized radiation, it is particularly advantageous to use the radiation rays from the radiation accelerator as the source of radiation.

On the other hand, as the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co compound-adsorbed $\gamma$-$Fe_2O_3$, Co compound-adsorbed $\gamma$-$Fe_3O_4$ inclusive of an intermediately oxidized state with $\gamma$-$Fe_2O_3$ (the Co compound here is meant for e.g. cobalt oxide, cobalt hydroxide, cobalt ferrite or cobalt ion-adsorbed substance, whereby the magnetic anisotropy of cobalt is utilized for the improvement of the coercive force), or iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb, Mn-Al, Fe-Co-Cr or Co-Ni-Cr. Further, a ferrite magnetic substance such as Ba ferrite or Sr ferrite may be mentioned.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have found that a magnetic recording medium with a noise level being sufficiently low and suitable for high d.ensity short wave recording is obtainable when the specific surface area as measured by BET method is at least 48 m²/g, the coercive force of the magnetic layer is at least 1000 Oe, and the surface roughness of the magnetic layer is at most 0.08μm as a $R_{20}$ value (an average value of 20 values) with a cut off of 0.17 mm by Talystep method. When such a magnetic layer is combined with the back coating layer of the present invention, the cinching phenomenon (the loosening of the tape winding when the tape has been stopped abruptly), dropouts and friction can be reduced. Further, there is a trend that as the base for the magnetic tape, a plastic film made of e.g. polyethylene terephthalate, polyethylene naphthalate, polyimide or polyamide has a thickness as thin as about 11 μm or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording layer and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the combination with the back coating layer of the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satifies the above-mentioned conditions for the coercive force and the specific surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of at least 48 m²/g, it is advisable to employ a surfactant, an organic titanium coupling agent or a silane coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further to calender treatment.

In a case where a radiation curable binder is used for both the magnetic layer and the back coating layer, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the property point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11μm or less and the surface hardness of the magnetic layer is small as the hardness of the magnetic metal powder is smaller than the magnetic oxide such as $\gamma$-$Fe_2O_3$, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

In addition to the above combination, a combination of the back coating layer of the present invention with a thin ferromagnetic metal film as the magnetic recording layer provides excellent electromagnetic conversion characteristics and good surface roughness and serves to prevent curling and minimize the dropouts.

The above-mentioned back coating layer of the present invention is advantageously used for a magnetic image recording tape in a system wherein the magnetic tape having the back coating layer is accomodated in a cassette half, and at the time of fast-forwarding or rewinding, the back coating surface of the magnetic recording tape is out of contact with the guides of the cassette half.

As described in the foregoing, according to the present invention, carbon black having an ash content of at most 0.05%, a specific surface area of from 20 to 350 m²/g, an oil absorption of at most 200 ml/100 g and an average particle size of from 13 to 60 mμm, is incorporated in the back coating layer, whereby the surface gloss and surface roughness of the back coating layer are improved, and the decrease of the electromagnetic conversion characteristics is thereby minimized since no adverse effect due to the tight winding is brought about under a high temperature storage condition.

Thus, the envelope properties are good. Further, the carbon black having wider ranges of the specific surface area, oil absorption and average particle size can be used.

The magnetic recording medium of the present invention can be used in a wide range of various fields such as audio tapes, video tapes, computers and magnetic discs.

Now, the present invention will be described in further detail with reference to Examples. However, it should be understood that the present invention is by no means restricted by these specific Examples.

In the following Examples, different kinds of magnetic layers and back coating layers were formed. Magnetic tapes were prepared with various combinations of such magnetic and back coating layers and examined for the effects of the present invention.

EXAMPLE 1

Formation of magnetic layers (metal oxide type)

Magnetic layer 1 (thermosetting-type magnetic layer)

|  | Parts by weight |
| --- | --- |
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black (antistatic Mitsubishi Carbon Black MA-600) | 5 |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following mixture was thoroughly mixed and dissolved.

|  | Parts by weight |
| --- | --- |
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill where the magnetic powder was treated, and the mixture was dispersed again for 42 hours. After the dispersing, 5 parts by weight (as solid content) of an isocyanate compound (Desmodule L, manufactured by Bayer AG) reactive and cross linkable with functional groups composed mainly of hydroxyl groups of the binder in the magnetic coating material, was mixed with the above coating material in the ball mill for 20 minutes.

The magnetic coating material thus prepared was applied onto a polyester film having a thickness of 15 $\mu$m, oriented on a parmanent magnet (1600 gauss), and the solvent was evaporated by means of an infrared lamp or hot air. Then, the coated film was subjected to surface smoothing treatment, and then kept in a rolled state in an oven maintained at 80° C. for 48 hours to promote the cross linking reaction by the isocyanate.

Magnetic layer 2 (radiation curable magnetic layer)

|  | Parts by weight |
| --- | --- |
| Cobalt-adsorbed acicular $\gamma$-$Fe_2O_3$ (long axis: 0.4 $\mu$m, short axis: 0.05 $\mu$m, Hc: 600 Oe) | 120 |
| Carbon black (antistatic Mitsubishi Carbon Black MA-600) | 5 |
| $\alpha$-$Al_2O_3$ powder (particle size: 0.5 $\mu$m) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following binder composition was thoroughly mixed and dissolved.

|  | Parts by weight |
| --- | --- |
| Acrylic double bond-introduced saturated polyester resin | 10 (as solid content) |
| Acrylic double bond-introduced vinyl chloride-vinyl acetate copolymer | 10 (as solid content) |
| Acrylic double bond-introduced polyether urethane elastomer | 10 (as solid content) |
| Solvent (MEK/toluene: 50/50) | 200 |
| Lubricant (higher fatty acid-modified silicone oil) | 3 |

The binder mixture was introduced into the ball mill wherein the magnetic powder was previously treated, and the mixture was again mixed and dispersed for 42 hours.

The magnetic coating material thus obtained was applied onto a polyester film having a thickness of 15 $\mu$m, and oriented on a parmanent magnet (1600 gauss). After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

Formation of back coating layers

Back coating layer 1 (radiation curable type)

|  | Parts by weight |
| --- | --- |
| Carbon black (ash content: 0.01%, specific surface area: 110 m²/g, oil absorption: 125 ml/100 g, average particle size: 27 m$\mu$m) | 100 |
| Lubricant: Stearic acid | 4 |
| Butyl stearate | 2 |
| Acryl-modified vinyl chloride-vinyl acetate-vinyl alcohol copolymer (molecular weight: 40,000) | 40 |
| Butyral resin | 20 |
| Acryl-modified polyurethane elastomer (prepared by the following method (b)) | 60 |
| Solvent mixture (MIBK/toluene) | 250 |

Back coating layer 2 (radiation curable type)

|  | Parts by weight |
|---|---|
| Carbon black (ash content: various, particle size: various, specific surface area: various, oil absorption: various) | 100 |
| Acryl-modified vinyl chloride-vinyl acetate-vinyl alcohol copolymer (prepared by the following method (a)) having a molecular weight of 30,000. | 80 |
| Acryl-modified polyurethane elastomer (prepared by the following method (b)) having a molecular weight of 20,000. | 80 |
| Polyfunctional acrylate having a molecular weight of 1,000 | 40 |
| Oleic acid | 4 |
| Solvent mixture (MIBK/toluene) | 250 |

The methods for the preparation of the radiation sensitive binders in the above mixture will be described as follows:

(a) Synthesis of an acryl-modified product of a vinyl chloride-vinyl acetate-vinyl alcohol copolymer 750 Parts by weight of S-lec A, 1250 parts by weight of toluene, and 500 parts by weight of cyclohexanone were charged into a four-necked flask of a 5-liter capacity and dissolved under heating. After raising the temperature to 80° C., 6.14 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI)

348 Parts by weight of tolylene diisocyanate was heated to a temperature of 80° C. in a four-necked flask of one-liter capacity in a nitrogen ($N_2$) stream. Thereafter, 260 parts by weight of 2-hydroxyethyl methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a urethane elastomer

250 Parts by weight of an isocyanate-terminated diphenylmethane diisocyanate (MDI) type urethane prepolymer, "Nipporan 3119", manufactured by Nippon Polyurethane Industry Co., 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

Each of these two back coating layers was applied, respectively, to the side of the substrate opposite to the side on which the magnetic recording layer was previously formed, so that the dried thickness would be 1.0 μm, then dried and subjected to calender treatment for smoothing the surface. Then, electron beams were irradiated on the back coating layer by means of an electron curtain type electron beam accelerator at an acceleration voltage of 150 KeV, at an electrode current of 10 mA and at an absorption dosage of 3 Mrad in a nitrogen atmosphere to cure the back coating layer.

Various characteristics of the magnetic tapes obtained from various combinations of the above magnetic layers and back coating layers are shown in Table 1. The carbon black used for the back coating layer 2 had an ash content of 0.05%, a specific surface area of 140 $m^2/g$, an oil absorption of 100 ml/100 g and an average particle size of 30 mμm. As a Comparative Example, carbon black having an ash content of 1.0%, a specific surface area of 140 $m^2/g$, an oil absorption of 100 ml/100 g and an average particle size of 27 mμm was used instead of carbon black in the back coating layer 1 (see Comparative Example 1').

TABLE 1

| No. | 1 | 2 | 3 | 4 | Comparative |
|---|---|---|---|---|---|
| Magnetic layer | 1 | 1 | 2 | 2 | 1 |
| Back coating layer | 1 | 2 | 1 | 2 | 1' |
| Gloss (%) | 110 | 105 | 110 | 105 | 95 |
| Surface roughness of the back coating layer (μm) | 0.07 | 0.09 | 0.07 | 0.09 | 0.18 |
| Electromagnetic conversion characteristics C—S/N (dB) | +0.3 | +0.5 | +0.6 | +1.0 | +0 |
| Runs at 20° C. under a relative humidity of 60% |  |  |  |  |  |
| Abrasion of the back coating layer | ○-△ | ○ | ○-△ | ○ | ○-△ |
| After being kept at 50° C. under a relative humidity of 80% for 5 days |  |  |  |  |  |
| C—S/N (dB) | +0.3 | +0.5 | +0.6 | +0.8 | −1.0 |
| Envelope | Good | Good | Good | Good | Fair |
| Dropouts | 10 | 10 | 10 | 10 | 40 |

From Table 1, it is evident that Samples Nos. 2, 3 and 4 where at least one of the layers is made of a radiation curable type resin, have better electromagnetic conversion characteristics, and particularly that those where the organic binder of the back coating layer is composed of (A), (B) and (C) (i.e. the back coating layer 2) are superior without abrasion of the back coating layer. Further, when the ash content of the carbon black is 0.05% or less, the gloss is good, and dropouts are minimum probably because the dispersibility is improved and the antistatic effects are adequately obtained. Furthermore, the surface roughness of the back coating layer is satisfactory, and no tight winding takes place even under high temperature and high humidity conditions at 50° C. under a relative humidity of 80%, whereby no decrease in the electromagnetic conversion characteristics is observed. Whereas, the Comparative Example is inferior in such properties as gloss, electromagnetic conversion characteristics and dropouts.

Now, with respect to the magnetic tapes prepared by a combination of the above-mentioned magnetic layer 2 and the back coating layer 2, various properties of the magnetic recording media obtained by using carbon black having an ash content of 0.01% with other physical properties being within or outside the ranges of the present invention, are shown in Table 2. The physical properties of each carbon black are as shown in FIGS. 1 and 2.

|  | Parts by weight |
|---|---|
| Ho = 1200 Oe, long axis: 0.4 μm, short axis: 0.05 μm, BET specific surface area: 52 m²/g) | |
| Vinyl chloride-vinyl acetate-vinyl alcohol copolymer (VAGH manufactured by UCC, U.S.A.) | 15 |
| Polyurethane prepolymer (Desmocol 22 manufactured by Bayer AG) | 10 |
| Methyl ethyl ketone/toluene (1/1) | 250 |
| Myristic acid | 2 |

TABLE 2

|  | A | B | C | D | E | F | G | H | I | J | K | L | M | N |
|---|---|---|---|---|---|---|---|---|---|---|---|---|---|---|
| Surface roughness of the back coating layer | 0.20 | 0.20 | 0.07–0.10 | | | 0.20 | | | | 0.07–0.10 | | | | 0.20 |
| Electromagnetic conversion characteristics C—S/N (dB) | −1.0 | −1.0 | +0.3–+1.0 | | | −1.0 | | | | +0.3–+1.0 | | | | −1.0 |
| Abrasion of the back coating layer After being kept at 50° C. under a relative humidity of 80% for 10 days | ○–△ | ○–△ | ○ | ○ | ○ | ○–△ | ○ | ○ | ○ | ○ | ○ | ○ | ○ | ○–△ |
| C—S/N (dB) | −1.0 | −1.0 | +0.3–+0.8 | | | −1.0 | | | | +0.3–+0.8 | | | | −1.0 |
| Envelope | Fair | Fair | Good | Good | Good | Fair | Good | Good | Good | Good | Good | Good | Good | Fair |
| Dropouts (number/min.) | 40 | 40 | 10 | 10 | 10 | 40 | 10 | 10 | 10 | 10 | 10 | 10 | 10 | 40 |

From Table 2, it is evident that when carbon black within the scope of the present invention is employed, the surface roughness of the back coating layer is excellent, and no tight winding takes place during high temperature storage, whereby no substantial deterioration of the electromagnetic conversion characteristics is observed. Further, the gloss is improved, whereby the magnetic tape will be excellent also from the viewpoint of the outer appearance of the back coating surface.

EXAMPLE 2

Different alloy magnetic layers were formed in the following manner, and magnetic recording media were prepared by combining them with the back coating layers of Example 1 and examined for the effects of the present invention.

Formation of magnetic layers

Various alloy powders were prepared by a wet-reduction method. These powders were composed of acicular particles having an axial ratio (short axis/long axis) of from 1/5 to 1/10 and had a residual magnetic flux density of from 2,000 to 3,000 gauss, a coercive force of from 1,000 to 2,000 Oe and a specific surface area of from 45 to 70 m²/g as measured by BET method. These magnetic powders were mixed in the following proportions in a usual manner to obtain the respective magnetic layers.

Magnetic layer 3 (Thermosetting type)

|  | Parts by weight |
|---|---|
| Fe—Co—Ni alloy powder | 100 |
| Sorbitan stearate | 2 |

To this mixture, 30 parts by weight of polyisocyanate (Desmodule L manufactured by Bayer AG) was added to obtain a magnetic coating composition. The magnetic coating composition was applied onto a polyester film in a thickness of 3.5 μm and then subjected to calender treatment.

Magnetic layer 4 (Radiation curable type)

The same magnetic alloy powder and base as used for the magnetic layer 3 were employed. The following mixture was applied onto a polyester film in a thickness of 3.5 μm and subjected to electron beam curing and calender treatment.

|  | Parts by weight |
|---|---|
| Fe—Co—Ni alloy powder | 100 |
| Vinyl chloride-vinyl acetate-vinyl alcohol copolymer (VAGH manufactured by UCC, U.S.A.) | 15 |
| Polyvinyl butyral resin | 10 |
| Acrylic double bond-introduced urethane | 10 |
| Methyl ethyl ketone/toluene (50/50) | 250 |

These magnetic layers 3 and 4 were combined with the back coating layers 1 and 2 to obtain magnetic recording media. The characteristics of the magnetic recording media are shown in Table 3. For the back coating layer 2, carbon black having an ash content of 0.05%, a specific surface area of 140 m²/g, an oil absorption of 100 ml/100 g, an average particle size of 30 mμm, was used. As the Comparative Example, carbon black having an ash content of 1.0%, a specific surface area of 140 m$^2$/g, an oil absorption of 100 ml/100 g, an average particle size of 27 mμm, was used (back coating layer 2') as the carbon black for the back coating layer 2. However, in this Example, calender treatment was conducted following the formation of each layer.

In the Table, (1) and (2) represent the order for the formation of the respective layers.

TABLE 3

| No. | 1 | 2 | 3 | 4 | 5 | Comparative |
|---|---|---|---|---|---|---|
| Magnetic layer | (1) 3 | (2) 3 | (2) 3 | (1) 3 | 4 | 3 |
| Back coating layer | (2) 1 | (1) 1 | (1) 2 | (2) 2 | 2 | 1' |
| Surface roughness of the back coating layer (μm) | 0.07 | 0.07 | 0.09 | 0.09 | 0.09 | 0.18 |
| Gloss (%) | 110 | 110 | 105 | 105 | 105 | 95 |
| Runs at 20° C. under a relative humidity of 60% | | | | | | |
| Abrasion of the back coating layer | ○-△ | ○-△ | ○ | ○ | ○ | ○-△ |
| Electromagnetic conversion characteristics C—S/N (dB) | | | | | | |
| Outside | +0.9 | +0.9 | +1.0 | +1.0 | +1.0 | 0 |
| Inside | +0.0 | +0.5 | +1.0 | +1.0 | +1.0 | 0 |
| After being kept at 50° C. under a relative humidity of 80% for 5 days | | | | | | |
| C—S/N (dB) | +0.9 | +0.9 | +1.0 | +1.0 | +1.0 | −1.0 |
| Envelope | Good | Good | Good | Good | Good | Fair |
| Dropouts | 50 | 40 | 30 | 30 | 30 | 80 |

From Table 3, it is evident that also with respect to the alloy magnetic powder, the surface roughness of the back coating layer is excellent, and the electromagnetic conversion characteristics are good, whereby fine dropouts are not observed. When the ash content is great, the tight winding takes place under high temperature and high humidity storage conditions due to the effects of the surface roughness of the back coating layer, whereby electromagnetic conversion characteristics deteriorate, and the friction was high. Good results were obtained with respect to the envelope and dropouts, when the ash content was 0.05% or less.

Further, in the combination of the magnetic layer 3 and the back coating layer 1, when the back coating layer was first formed, followed by the formation of the magnetic layer, the electromagnetic conversion characteristics was +0.9 at the outside of the tape winding and +0.5 at the inside of the tape winding, thus indicating a substantial influence of the tightening of the tape winding during the thermosetting. Accordingly, in such a case, it is better to form the magnetic layer first to minimize the deterioration of the electromagnetic conversion characteristics.

Then, the surface roughness of the video tapes obtained by the above combination of the magnetic layer 4 and the back coating layer 2 was studied. FIG. 3 shows the S/N ratios (relative values) in the case where the video tapes were driven at a speed of 3.8 m/sec, and the recording and reproduction were conducted with a major frequency of 5 MHz. The numerical values allotted to the curves indicate the surface roughness of the magnetic layer. As is evident from the Figure, the S/N ratio can be kept at a high level when the surface roughness of the magnetic layer is at most 0.08 μm, and the surface roughness of the back coating layer is at most 0.6 μm. Similar results were obtained in the case of other combinations.

Figure 4:
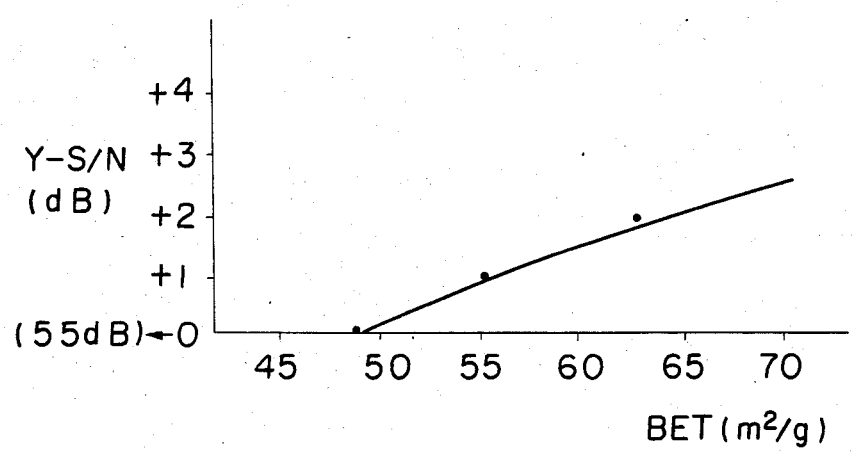
FIG. 4 is a graph illustrating the relation between the BET specific surface area of an alloy magnetic powder and the S/N ratio.

The relation between the BET specific surface area of the alloy powder and the S/N ratio was investigated with respect to the above video tapes wherein the surface roughness of the magnetic layer was at most 0.08 μm and the surface roughness of the back coating layer was within a range of from 0.05 to 0.6 μm, whereby the results as shown in FIG. 4 were obtained. However, 55 dB was employed as the reference. From FIG. 4, it is apparent that excellent characteristics are obtainable when the BET value is at least 48 m$^2$/g. Similar results were obtained in the case of other combinations.

Further, the tightening of the tape winding was measured, and at 40° C. under a relative humidity of 80%, satisfactory results were obtained in all cases.

EXAMPLE 3

On one side of a polyethylene terephthalate base film having a thickness of 10 μm, a Co-Ni alloy (Hc: 1100 Oe) was vapour-deposited by vacuum deposition in an average thickness of 0.2 μm to form a thin magnetic layer.

Each of the back coating layers 1 and 2 of Examples 1 and 2 was applied, respectively, to the side of the substrate opposite to the side on which the magnetic recording layer composed of a thin metal film was thus formed, so that the dried thickness would be 1.0 μm, then dried and subjected to calender treatment for smoothing the surface. Then, electron beams were irradiated on the back coating layer by means of an electron curtain type electron beam accelerator at an acceleration voltage of 150 KeV, at an electrode current of 10 mA and at an absorption dosage of 3 Mrad in a nitrogen atmosphere to cure the back coating layer. Various characteristics of these magnetic tapes were tested, and the results are shown in Table 4. For the back coating layer 2, carbon black (ash content: 0.05%, specific surface area: 140 m$^2$/g, oil absoption: 100 ml/100 g, average particle size: 30 mμm) was used.

TABLE 4

| Back coating layer | Present invention 1 | Present invention 2 |
|---|---|---|
| Surface roughness of the back coating layer (μm) | 0.07 | 0.09 |
| Runs at 20° C. under a relative humidity of 60% | | |
| Abrasion of the back coating layer | ○-△ | ○ |
| After being kept at 50° C. under a relative humidity of 80% for 5 days | | |
| C—S/N | +1.0 | +1.2 |
| Envelope | Good | Good |
| Dropouts | 60 | 60 |
| Electromagnetic conversion characteristics C—S/N (dB) | | |
| Outside | +1.9 | +1.2 |
| Inside | +1.9 | +1.2 |
| Curling | None | None |

From Table 4, it is evident that also in the case of the metal vapour-deposited tape, the electromagnetic conversion characteristics are improved, no tight winding takes place under high temperature and high humidity conditions, and the curling problem specific to the metal vapour-deposited tape is overcome.

EXAMPLE 4

In the above back coating layer 2, x parts by weight of $SiO_2$ (average particle size: 30 mμm, BET specific surface area: 80 m$^2$/g) and y parts by weight of carbon black (ash content: 0.05%, specific surface area: 140 m$^2$/g, oil absorption: 100 ml/100 g, average particle size: 30 mμm) (x+y=200) were incorporated. The characteristics of a magnetic tape prepared by the combination of the back coating layer thus obtained and the magnetic layer 2, are shown in Table 5.

From Table 5, it is evident that the incorporation of $SiO_2$ is effective for the reduction of abrasion of the back coating layer. Further, it is evident that the ratio of the inorganic pigment/carbon black is preferably from 9/1 to 1/9, more preferably from 7/3 to 3/7, since if it exceeds 9/1, the dropouts increase, and if it is less than 1/9, the winding appearance of the tape is inferior, and the abrasion is observed.

Further, similar results are obtainable when an alloy magnetic layer or a ferromagnetic thin film is used for the combination.

TABLE 5

| | | | | | | | | |
|---|---|---|---|---|---|---|---|---|
| $SiO_2$ | x | 200 | 180 | 140 | 100 | 60 | 20 | 0 |
| Carbon | y | 0 | 20 | 60 | 100 | 140 | 180 | 200 |
| 100 runs at 20° C. under a relative humidity of 60% | | | | | | | | |
| Abrasion of the back coating layer | | ⊙ | ⊙ | ⊙ | ⊙ | ⊙ | ○ | ○ |
| Winding appearance | | X | ⊙ | ⊙ | ⊙ | ⊙ | ⊙ | ○ |
| Dropouts | | 250 | 150 | 100 | 50 | 40 | 40 | 40 |
| Electric resistance (Ω/cm$^2$) | | $1 \times 10^{12}$ | $3 \times 10^{10}$ | $1 \times 10^{8}$ | $1 \times 10^{8}$ | $1 \times 10^{7}$ | $10^7$ or less | $10^7$ or less |

The above-mentioned various characteristics were measured or evaluated as follows:

1. Abrasion of the back coating layer

By means of a commercially available VHS system VTR, a tape was permitted to run at 20° C. under a relative humidity of 60%, whereupon the scratches on the back coating surface were observed. Symbol indicates a very clean surface condition, symbol indicates that no stain was observed, symbol △ indicates that slight strain was observed, and symbol X indicates that substantial stains were observed.

2. Dropouts

By using a VHS deck at 50° C. under a relative humidity of 80%, a single signal of 5 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts. The dropouts prior to the running test of the magnetic tape (initial) and the dropouts after 100 runs were measured.

3. Surface roughness

The surface roughness was obtained by 20 point average method from the chart obtained by means of Talystep (manufactured by TAYLOR-HOBSON CO.). A cut off of 0.17 mm and a needle-pressure of 0.1×2.5μ were employed.

4. Electromagnetic conversion characteristics

The recording and reproduction were conducted at a major frequency of 5 MHz and the S/N ratio (relative value) at the time of a departure by 0.7 MHz from 5 MHz was taken. The Comparative Example was used as the reference being 0 dB. A VTR of VHS was modified so that it was capable of measuring up to 5 MHz.

5. Electron microscopic method

The average particle size was measured by a transmission electron microscope by selecting a sample from each tape and observing at least 100 particles with 500,000 to 1,000,000 magnifications.

6. Oil absorption: in accordance with JIS K-6221-1982

7. Specific surface area:

The specific surface area is represented by the surface area (m$^2$) per unit weight (g) of carbon black, and calculated from the amount of nitrogen adsorbed.

What is claimed is:

1. A magnetic recording medium comprising a non-magnetic substrate, a magnetic recording layer formed on one side of the substrate and a back coating layer formed on the other side of the substrate, characterized in that the back coating layer contains carbon black having an ash content of at most 0.05%, a specific surface area of from 20 to 350 m$^2$/g, an oil absorption of at most 200 ml/100 g and an average particle size of from 13 to 60 mμm.

2. The magnetic recording medium according to claim 1, wherein the back coating layer contains a lubricant.

3. The magnetic recording medium according to claim 1, wherein the back coating layer contains, in addition to carbon black, an inorganic pigment having an average particle size of from 10 to 100 mμm.

4. The magnetic recording medium according to claim 1, wherein an organic binder in the back coating layer is of radiation curable type.

5. The magnetic recording medium according to claim 1, wherein the magnetic recording layer is composed essentially of a ferromagnetic alloy powder dispersed in a resin binder and having a specific surface area of at least 48 m²/g as measured by BET method, and has a coercive force of at least 1000 Oe and a surface roughness of at most 0.08 μm.

6. The magnetic recording medium according to claim 1, wherein the magnetic recording layer is a thin ferromagnetic film.

* * * * *